| United States Patent [19] | [11] | 4,282,399 |
|---|---|---|
| Kippenhan, Jr. et al. | [45] | Aug. 4, 1981 |

[54] SHARED MAINTENANCE TERMINAL SYSTEM

[75] Inventors: Herbert A. Kippenhan, Jr., Elmhurst, Ill.; Eugene E. Nelson, Shore View, Minn.; George T. Ricker, Jr., Downers Grove, Ill.

[73] Assignee: GTE Automatic Electric Labs Inc., Northlake, Ill.

[21] Appl. No.: 43,290

[22] Filed: May 29, 1979

[51] Int. Cl.³ .......................... G06F 3/12; H04L 5/14; H04L 5/24; H04M 3/22

[52] U.S. Cl. ................. 178/4; 179/175.2 R; 364/200; 370/41

[58] Field of Search ............... 179/175.2 C, 175.2 R, 179/175.3 R, 27 G, 27 FF, 1 MN; 178/3, 4.1 R, 4; 235/303.4, 303.42, 303.41, 303.3; 371/11, 18, 20; 370/41; 364/200 MS File

[56] References Cited

U.S. PATENT DOCUMENTS

| 3,654,603 | 4/1972 | Gunning et al. | 235/303.3 X |
| 3,820,084 | 6/1974 | Jones et al. | 364/200 |
| 3,969,594 | 7/1976 | De Luca et al. | 179/175.3 R |
| 4,095,045 | 6/1978 | Johnson et al. | 178/3 X |

FOREIGN PATENT DOCUMENTS 2223364  11/1973  Fed. Rep. of Germany .... 179/175.2 C

OTHER PUBLICATIONS

"The Automation of Maintenance and Administrative Functions in Traditional and Electronic Switching Systems"–by deFlammineis et al., CSELT/Rapporti Techici, vol. 4 No. 4, Dec. 1976, pp. 219–227.

Primary Examiner—Thomas W. Brown
Attorney, Agent, or Firm—Robert J. Black; Frank J. Bogacz

[57] ABSTRACT

A shared maintenance terminal system permitting the joint use of a teletypewriter located at a telephone switching center by the switching center and by a remotely located data processing center. This maintenance terminal system provides interlock control for input and output messages from a craftsman located at the telephone switching center or from personnel located at the remote data processing site.

6 Claims, 3 Drawing Figures

SHARED MAINTENANCE TERMINAL SYSTEM

BACKGROUND OF THE INVENTION (1) Field of the Invention

The present invention pertains to transmission of messages between two systems controlled by central processing units and more particularly to a connection of two central processing units to a common teletypewriter providing for interlock control of input and output messages sent between the two central processing units and the common teletypewriter.

(2) Description of the Prior Art

With the advent of electronic telephone switching systems, it is necessary that maintenance of the sophisticated equipment located in such systems be accomplished. The maintenance of such equipment as computer central processing units, electronic line and trunk circuitry and input/output equipment associated with a computer require well trained and knowledgeable craftsmen in order to maintain the proper operation of the switching system.

Typically, each electronic switching center would require such well-trained personnel to be present at the particular site should problems arise. The cost of providing such persons at each site is high. In addition, such skilled personnel would have to be provided on an around the clock basis, since telephone service must be provided 24-hours a day.

Therefore, in an effort to economize on the technically skilled manpower required, such telephone manufacturers as GTE Automatic Electric have developed systems with the ability to monitor from a remote location a number of electronic switching centers. One such system manufactured by GTE Automatic Electric is the Remote Monitor and Control System (RMCS). The RMCS system permits remote monitoring and maintenance of up to 16 electronic telephone switching centers. Each electronic telephone switching center has an input/output terminal device such as a teletypewriter. This terminal device is used for input and output of messages concerning the configuration and maintenance activity of a particular switching center. One such electronic telephone switching center (EAX) is manufactured by GTE Automatic Electric and is described, showing the organization and input/output structure, in U.S. Pat. Nos. 3,820,084 issued on June 25, 1974 to L. V. Jones et al and 3,831,151 issued to L. V. Jones et al on Aug. 20, 1974.

Prior to remote monitoring systems such as RMCS, a simple solution to remote monitoring of the maintenance terminal device of each electronic switching center was accomplished in the following way. A second terminal device was connected in parallel with the existing maintenance terminal device via a dedicated telephone line. Originally this parallel connected remote terminal device performed in only a monitor capacity. That is, the terminal would print all the messages as printed by the local maintenance terminal device and would not be capable of providing input from the remotely located terminal device.

The next feature that was provided was that of giving the ability of the remotely located maintenance terminal device to input messages to the electronic switching center. The problem thereby resulting was that of overlaping input requests from the local and the remote maintenance terminal device. Since the craftsman at the local maintenance terminal would not be aware of what functions the craftsman located at the remote maintenance terminal was performing, nearly simultaneous input requests could easily be generated by the local and remote terminal devices. The electronic switching center could not determine whether the local or remote maintenance device had made the input request, thereby receiving errors in the transmission of the message.

Since the RMCS system monitors up to 16 electronic switching centers, it is of critical importance that input requests to each switching center are not repeated because of errors in reception by the electronic switching center due to the above mentioned problem.

U.S. Pat. Nos. 3,506,794, issued on Apr. 14, 1970, to W. Chulak; 3,892,928, issued on July 1, 1975, to R. Casterline et al; 3,958,111, issued on May 18, 1976, to J. Hackett; and 3,980,839, issued on Sept. 14, 1976, to A. Hutcheson, teach the use of diagnostic monitoring apparatus.

Therefore, it is the object of the present invention to provide a shared maintenance terminal control system for use in message transmission between a data processing center and an electronic telephone switching center including the terminal device, to prevent reception errors during message transmission between the data processing and telephone switching centers by means of interlock control.

It is also a feature of the present invention to provide the capability of selective message routing between the switching center, data processing center and terminal device.

SUMMARY OF THE INVENTION

The present invention consists of a shared maintenance terminal device located at a telephone switching center connected to said telephone switching center, and to a remotely located data processing center. This system provides interlock control of access by both the data processing center and the telephone switching center to the terminal device. The present invention permits the inputting and outputting of messages on the terminal device without the overlapping of messages which would result in reception errors by the telephone switching center.

In part, the present invention consists of latching control logic included in a device buffer and corresponding relays included in the teletypewriter to perform the functions of initiate printing and terminate printing. In addition, another special function is implemented via a latch and corresponding relay; a special character code is implemented to provide for disabling message recognition by the switching center. The device buffer is connected via input and output connections to a terminal device such as a teletypewriter and via a Y-connection to the remote data processing center. The telephone switching center is connected to the remote data processing center via a pair of modems and a telephone line connecting the modems. Further alterations are implemented within the data processing center to provide for full duplex operation of the modems.

In the case where the maintenance terminal device is to be used for the output of a message (printing of a message), the telephone switching center checks the input request status of the terminal to determine whether an input request is in progress. If no input request is in progress on the terminal, the telephone switching center causes the output of a message immediately. However, if the terminal is presently in use for an input request, the switching center waits until the current request is completed before it causes the message to be output on the terminal.

If the message is of the type to be sent only to the remotely located data processing center, a stop print character is prefixed to the message to be sent and a start print character is suffixed to the message. This has the effect of transmitting the message only to the remote data processing center and not printing the message on the terminal device. These special characters appended to the message are detected by the control logic, and appropriate relays are activated which control the printing operation of the maintenance terminal device. All of the above mentioned special characters are control codes within the American Standard Code For Information Interchange (ASCII).

If the message output by the telephone switching center is to be broadcast to both the terminal device and the remote data processing center, the special characters are not added to the message thereby, not inhibiting the terminal device from printing the message.

The maintenance terminal device also provides the capability for use by a craftsman located at the switching center to input messages to the switching center. To accomplish this the craftsman initiates an input request via the terminal device. If the terminal is not presently in use, the request is immediately acknowledged and craftsman may input his message. If an output or other input request is currently in progress, the craftsman's input request is not acknowledged until the completion of the other requests. At this time, the craftsman may input his message to the switching center.

The shared maintenance terminal device may be used by the remote data processing system for the input of messages to the telephone switching center. To accomplish this, the data processing center initiates an input request (in much the same fashion as a craftsman at the telephone switching center would initiate an input request). If the terminal device is currently idle, the input request is immediately acknowledged. If any another input or output request is currently in progress, the input request is not acknowledged until the current request in progress has been completed. The data processing center may then transmit its input request to the switching system. This request will be seen by the switching center as if it had been input locally via the terminal device.

In addition, the data processing center may transmit the message only to the maintenance terminal device itself, and not to the switching center. To accomplish this, the data processing center prefixes the transmission of the message with another special character. This special character is a text ignore character and causes the control logic in the switching center to ignore the reception of the message following. This has the effect of printing the message only on the maintenance terminal device. In order to reset the control logic within the switching center, the data processing center sends another text ignore character at the completion of the message. This second text ignore character serves to reset the logic in the switching center so that it will recognize subsequent text ignore characters transmitted.

If the data processing center is to transmit the message only to the switching center and not print the message on the terminal device, the message is prefixed and suffixed with the stop print and start print characters respectively, as described above.

DESCRIPTION OF THE PREFERRED EMBODIMENT

Figure 1:
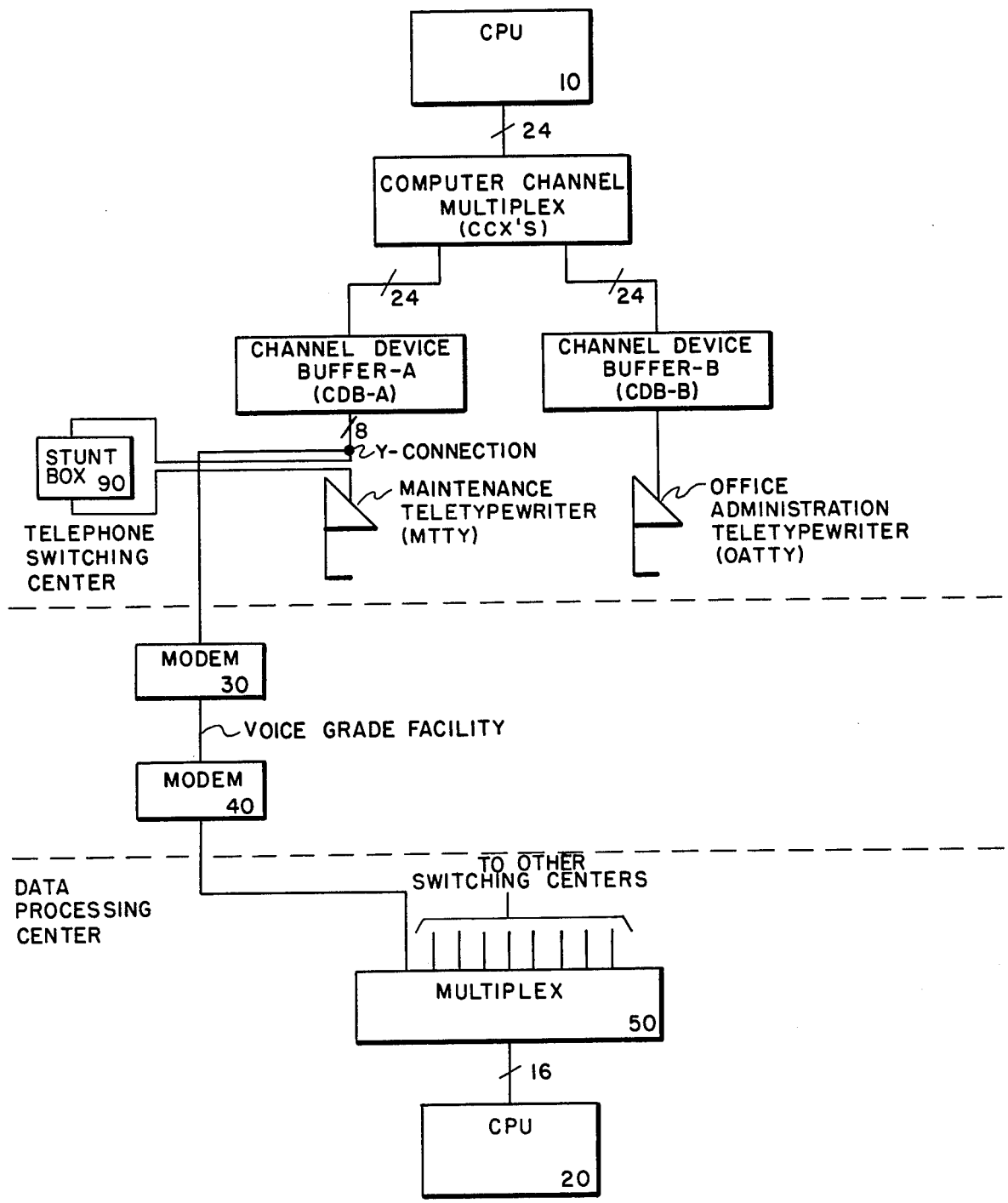
FIG. 1 is a block diagram depicting the principles of operation of the present invention.

Referring to FIG. 1, a shared maintenance teletypewriter MTTY is shown connected to a central processing unit 10 of a telephone switching center and also to a central processing unit 20 of a data processing center. Interlock control is provided whereby simultaneous access of both the data processing center and the telephone switching center to the MTTY is prohibited. The maintenance teletypewriter MTTY consists of a model 35 KSR teletypewriter manufactured by the Teletype Corporation. Although the model 35 KSR teletypewriter is specified in the present preferred embodiment, the present invention is not limited solely to the use of that device. Other teletypewriters or suitable terminal devices may also be employed. The data processing center of which central processing unit 20 is a part, consists of a PDP-11/34 CPU, manufactured by the Digital Equipment Corporation. The telephone switching center consists of a No. 1 Electronic Automatic Exchange (EAX) manufactured by GTE Automatic Electric Co.

In order to perform automated maintenance of a telephone switching center economically, it is necessary that messages comprising streams of alphanumeric characters be transmitted to and from the telephone switching center. The telephone switching center (EAX) consists in relative part of central processing unit 10 connected via a 24 bit bus to a computer channel multiplex CCX. In turn, the CCX is connected to a plurality of device buffers, two of which are depicted in FIG. 1. The connection from the CCX to each device buffer is also a 24 bit bus. Channel device buffer-A CDB-A connects the maintenance teletypewriter MTTY to the CPU 10 of the switching center. Similarly, channel device buffer-B CDB-B connects an office administration teletypewriter OATTY to CPU 10. Messages are input and output via the MTTY and OATTY for the purposes of craftsmen located on site at the telephone switching center.

The telephone switching center (EAX) is shown, in part, by the above-mentioned U.S. Pat. Nos. issued to L. V. Jones et al, 3,820,084; and 3,831,151. The CPU 10 is manufactured by GTE Automatic Electric Co. and is shown as item 135 in FIG. 2 of U.S. Pat. No. 3,820,084 and as item 135 in FIG. 9 of U.S. Pat. No. 3,831,151. The channel multiplex CCX and channel device buffers CDB-A and CDB-B are collectively represented by item 137 in the above mentioned figures. The maintenance teletypewriter MTTY is shown as item 145 in these same figures. The office administration teletypewriter OATTY, not a part of the present invention, is not shown.

The data processing center has its central processing unit 20 connected via a 16 bit bus to multiplex 50. Multiplex 50 is a model DZ-11 multiplex manufactured by the Digital Equipment Corporation. Multiplex 50 provides connection for up to 16 different switching centers to the data processing center. The data processing center is connected to the telephone switching center by means of a pair of modems 30 and 40, connected by a voice grade telephone line facility. Modems 30 and 40 may be implemented via a GTE Lenkurt model 25B-108 modem, a Western Electric Co. model 103-C or similar substitute. Modem 30 is further connected via a Y-connection to the common connection of CDB-A and the maintenance teletypewriter MTTY. In part, the improvement comprising the present invention consists of modems 30 and 40 connected via a voice grade facility (a telephone line) between a telephone switching center and a data processing center. The connection of modem 30, channel device buffer CDB-A and maintenance teletypewriter MTTY forms a Y-connection. This connection consists of both input and output leads connecting each of the above mentioned devices. Further, the improvement consists of latches contained in channel device buffer CDB-A and corresponding relay devices contained within the maintenance teletypewriter MTTY. These latches and relays provide the functions of detecting specific character codes and performing a basic operation in response to the detection of these codes.

The latches of the present invention are previously unused latches within the CDB-A, similar to items 541, 542 or 543 of FIG. 6 of U.S. Pat. No. 3,831,151. These latches operate in response to the detection of special character codes to operate relays connected to the output of the latches to start and stop the printing of the MTTY. The latches are commercially available set/reset devices manufactured by Texas Instruments Co. and others. The relays are HQA type manufacture by GTE Automatic Electric Co., not forming a part of the present invention, and need only provide the functions as set forth herein. Further improvements have been made to CPU 20 to permit and facilitate the implementation of a full duplex mode of transmission between the data processing center and telephone switching center. These improvements provide for control logic of simultaneous sending and receiving of messages, such control logic is well known in the art of simultaneous data transmission.

Typically, CPU 10 transmits messages to the maintenance teletypewriter MTTY or the office administration teletypewriter OATTY. These messages are printed on the respective teletypewriter. In addition, each teletypewriter is capable of inputting messages to CPU 10. CPU 10 also transmits messages to CPU 20 via the present invention. A message comprising a string of alpha-numeric characters is transmitted via computer channel multiplex CCX and channel device buffer CDB-A, via modem 30, the voice grade facility, receiving modem 40 and through multiplexer 50 to CPU 20. CPU 20 collects and analyzes these messages to determine the performance of the telephone switching center. A message transmitted as described above is both printed on the maintenance teletypewriter MTTY and transmitted to the remotely located data processing center.

Figure 2:
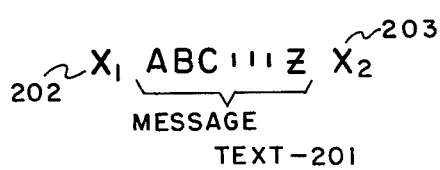
FIGS. 2 and 3 are sample messages employing special control characters.

If a message is to be sent only to the remotely located data processing center, reference FIG. 2, the message text 201 is prefixed by a stop print character 202 and suffixed by a start print character 203. The transmission of this message by CPU 10 to CPU 20 causes the latching devices of channel device buffer CDB-A and relays of maintenance teletypewriter MTTY to respond in such a fashion that the printing function is inhibited by the stop print character. The message is then transmitted and is not printed on the maintenance teletypewriter MTTY, but is received only by the data processing center CPU 20. After the last character comprising the message 201 is transmitted, the start print character is recognized by the latching and relay means and the printing function of the maintenance teletypewriter MTTY is again enabled. The above scheme is also employed by the data processing center to transmit messages to the telephone switching center without the printing of these messages on the maintenance teletypewriter MTTY.

In addition, the data processing center may desire to print messages on the maintenance teletypewriter MTTY without transmitting these messages to the telephone switching center CPU 10. In order to accomplish this, another special character is prefixed and suffixed to a message text.

Figure 3:
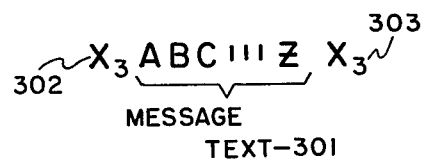

FIG. 3 shows the construction of such a message. A third special character (text ignore) 302 and 303 is shown prefixed and suffixed to the message text 301. When this message is transmitted from the data processing center to the telephone switching center, the text ignore character is detected by the control latch of channel device buffer CDB-A and CPU 10 is prevented from receiving the message. This has the effect of printing the message only upon the maintenance teletypewriter MTTY under the control of the remotely located data processing center.

The maintenance teletypewriter MTTY provides for input use by a craftsman located at the telephone switching center and also by the data processing center via the present invention. To resolve the possibility of conflict of simultaneous input requests by the craftsman and the data processing center, the first input request that is received is latched by the channel device buffer CDB-A. A particular input request sequence is initiated depending upon whether the craftsman or the data processing center is requesting input to the telephone switching center. The first input request which is received is responded to by the telephone switching center. Any subsequent input requests from the maintenance teletypewriter MTTY or the data processing center are not given acknowledgement until the request which is currently in progress is completed. When an input request is generated, a corresponding latch is set; at the end of the input request the latch is reset thereby allowing other input requests to be processed by the telephone switching center.

The special characters used to implement the above mentioned scheme (stop print character, start print character, and text ignore character) are implemented by means of unused control character codes within the American Standard Code for Information Interchange (ASCII). The above-mentioned control codes may be implemented utilizing such ASCII control codes as (CONTROL-Q).

Although a preferred embodiment of the invention has been illustrated, and that form described in detail, it will be readily apparent to those skilled in the art that various modifications may be made therein without departing from the spirit of the invention or from the scope of the appended claims.

What is claimed is:

1. A telephone switching center including a first central processing unit, a first multiplex unit and a printing input/output terminal, and said switching center connected to a data processing center including a second central processing unit and a second multiplex unit, the improvement comprising:

voice transmission means connected between said telephone switching center and said data processing center operated in response to messages generated by said first central processing unit to transmit said messages to said second central processing unit, and alternatively operated in response to messages generated by said second central processing unit to transmit said generated messages to said first central processing unit;

circuit means connected to said input/output terminal operated in response to first and second characters of said transmitted messages to start and stop the printing of said input/output terminal respectively; and circuit connection means for connecting said first multiplex unit of said first central processing unit to said input/output terminal and for connecting said second multiplex unit via said voice transmission means to the common connection of said first multiplex unit and said input/output terminal whereby messages are transmitted from said first central processing unit concurrently to said input/output terminal and to said second central processing unit, and alternatively messages are transmitted from said second central processing unit concurrently to said first central processing unit and to said input/output terminal.

2. The improvement according to claim 1, wherein said voice transmission means further includes:

a first modem connected to said telephone switching center operated to send and receive messages;

a second modem connected to said data processing center operated to send and receive messages; and a transmission line connecting said first and said second modems.

3. The improvement according to claim 2, wherein: said first and said second modems are further connected via said transmission line for operation in a full-duplex configuration to send and receive messages simultaneously.

4. The improvement according to claim 1, wherein said circuit connection means further includes:

input connections from said first central processing unit to said input/output terminal;

output connections from said first central processing unit to said input/output terminal;

input connections from said second central processing unit to said input/output terminal; and output connections from said second central processing unit to said input/output terminal.

5. The improvement according to claim 1, wherein said circuit means further includes means responsive to said first character to initiate the printing of messages by said input/output terminal; and means responsive to said second character to terminate the printing of said messages by said input/output terminal.

6. The improvement according to claim 5, wherein: said means responsive to said first and to said second characters are selectively operated in response to messages transmitted from said first central processing unit and alternatively operated in response to messages transmitted from said second central processing unit.

* * * * *